United States Patent
Halper et al.

(10) Patent No.: US 12,420,606 B2
(45) Date of Patent: Sep. 23, 2025

(54) DUAL PISTON ADJUSTER

(71) Applicant: ACCUTUNE OFF-ROAD, INC., El Cajon, CA (US)

(72) Inventors: Jeff Halper, Scotts Valley, CA (US); Ryan Raker, La Mesa, CA (US)

(73) Assignee: ACCUTUNE OFF-ROAD, INC., El Cajon, CA (US)

( * ) Notice: Subject to any disclaimer, the term of this patent is extended or adjusted under 35 U.S.C. 154(b) by 88 days.

(21) Appl. No.: 18/491,151

(22) Filed: Oct. 20, 2023

(65) Prior Publication Data

US 2025/0128558 A1    Apr. 24, 2025

(51) Int. Cl.
| | |
|---|---|
| *B60G 17/015* | (2006.01) |
| *F16F 9/348* | (2006.01) |
| *F16F 9/44* | (2006.01) |
| *F16F 9/50* | (2006.01) |

(52) U.S. Cl.
CPC .......... *B60G 17/015* (2013.01); *F16F 9/3484* (2013.01); *F16F 9/44* (2013.01); *F16F 9/50* (2013.01); *F16F 2230/186* (2013.01)

(58) Field of Classification Search
CPC .. B60G 17/015; B60G 17/08; B60G 2500/10; F16F 9/3484; F16F 9/44; F16F 9/50; F16F 9/186; F16F 9/468; F16F 9/5126
See application file for complete search history.

(56) References Cited

U.S. PATENT DOCUMENTS

| | | | |
|---|---|---|---|
| 7,766,138 B2 | 8/2010 | Sintorn | |
| 9,091,319 B2 | 7/2015 | Ishii et al. | |
| 9,556,925 B2 | 1/2017 | Marking | |
| 10,156,280 B2 | 12/2018 | Murphy | |
| 10,556,477 B2 | 2/2020 | Marking | |
| 11,279,199 B2 | 3/2022 | Marking | |
| 2014/0144737 A1 * | 5/2014 | Endo ..................... | F16F 9/3405 188/275 |

(Continued)

FOREIGN PATENT DOCUMENTS

| | | | | |
|---|---|---|---|---|
| DE | 102018114679 B3 * | 5/2019 | .............. | F16F 9/061 |
| EP | 0202941 A2 * | 11/1986 | .............. | F16F 9/003 |

(Continued)

*Primary Examiner* — James A English
(74) *Attorney, Agent, or Firm* — Jacob M. Ward; Ward Law Office LLC

(57) ABSTRACT

A dual piston adjuster for a shock absorber has a first damping piston and a second damping piston. A first fluid path includes a first cross-sectional flow area and provides fluid communication of a working fluid to bypass the damping pistons. A second fluid path provides fluid communication of the working fluid from the first fluid path through the first damping piston and the second damping piston in series. A third fluid path includes a second cross-sectional flow area and provides fluid communication of the working fluid from the second fluid path at a location between the first damping piston and the second damping piston to bypass the second damping piston. A first adjustable valve is provided to selectively adjust a first pressure drop of the working fluid in the first fluid path and a second adjustable valve is provided to selectively adjust a second pressure drop of the working fluid in the third fluid path.

20 Claims, 8 Drawing Sheets

(56) References Cited

U.S. PATENT DOCUMENTS

| | | | | |
|---|---|---|---|---|
| 2014/0203530 A1* | 7/2014 | Coombs | .................... | F16F 9/18 |
| | | | | 188/266.2 |
| 2016/0201753 A1* | 7/2016 | Nakano | .................. | F16F 9/468 |
| | | | | 188/266.3 |
| 2019/0390730 A1* | 12/2019 | Russell | .................. | B60G 13/08 |
| 2022/0203799 A1 | 6/2022 | Marking | | |
| 2022/0242186 A1* | 8/2022 | Tong | ....................... | F16F 9/516 |
| 2023/0356558 A1* | 11/2023 | Taylor | .................... | B60G 17/08 |

FOREIGN PATENT DOCUMENTS

| | | | | | |
|---|---|---|---|---|---|
| EP | 3461663 | B1 * | 8/2022 | ....... | C12Y 203/0115 |
| JP | 2015183782 | A * | 10/2015 | | |
| WO | WO-2011023351 | A1 * | 3/2011 | .............. | F16F 9/464 |

* cited by examiner

DUAL PISTON ADJUSTER

FIELD

The present technology relates to a shock absorber, including a dual piston adjuster for a fluid reservoir of a shock absorber.

INTRODUCTION

This section provides background information related to the present disclosure which is not necessarily prior art.

Shock absorbers are used on a variety of vehicles including automobiles, trucks, motorcycles, and bicycles to damp the transmission of forces from a wheel of the vehicle to the frame or another structural component of the vehicle. Shock absorbers typically include a spring that can be compressed or elongated to receive the energy related to the forces from the wheel of the vehicle and a damper to damp the energy and minimize the transmission of the forces to the vehicle. Damping such forces can improve the comfort of a driver or an operator as well as a passenger of the vehicle. The damping of the forces can also facilitate maintaining the wheel in contact with the ground and/or the surface on which the vehicle is traversing. By maintaining the wheel in contact with the ground, the wheel can maximize an application of driving, braking, and turning forces to the ground which improves the driving and handling characteristics of the vehicle.

The nature of the ground surface and the speed of the vehicle traveling across the ground surface create a variety of forces that are exerted on the wheel. These forces can generally be categorized as being high speed and low speed forces that can require either small movements or large movements of the shock absorber assembly to satisfactorily damp the forces from the wheel. Typically, the shock absorber includes a valve assembly or a piston assembly that is tuned to resist a flow of a working fluid within the shock absorber to provide the desired force damping. The valve assembly can be tuned to optimize the damping response to either a high speed-small movement, a high speed-large movement, a low speed-small movement, or a low speed-large movement force from the wheel. However, many vehicles operate in an environment where all such forces will be encountered by the wheel. Accordingly, an optimal shock absorber would provide a broad range of damping capabilities to maximize its damping effectiveness across a broad spectrum of terrains and vehicle speeds. Known shock absorbers provide valve assemblies that require some compromise to the range of damping capabilities. The damping capability of one type of force, high speed-small movement, for example, can be optimized while damping capability of another type of force, low-speed-large movement, for example, would then be suboptimized.

Accordingly, there is a need for a shock absorber with an improved valve assembly to provide damping capabilities across the broad range of forces that can be transmitted from a wheel to a frame or other structural component of a vehicle.

SUMMARY

In concordance with the instant disclosure, a dual piston adjuster for a shock absorber has surprisingly been discovered.

The present technology includes articles of manufacture, systems, and processes that relate to shock absorbers and dual piston adjusters and/or valve assemblies for shock absorbers.

In one embodiment, a dual piston adjuster for a shock absorber includes a first damping piston and a second damping piston. The dual piston adjuster includes a first fluid path, a second fluid path, and a third fluid path. The first fluid path can have a first cross-sectional flow area and provide fluid communication bypassing the first damping piston and the second damping piston. The second fluid path provides fluid communication from the first fluid path through the first damping piston and the second damping piston in series. The third fluid path includes a second cross-sectional flow area and provides fluid communication from the second fluid path at a location between the first damping piston and the second damping piston to bypass the second damping piston. A first adjustable valve is provided to selectively adjust a first pressure drop of a working fluid in the first fluid path and a second adjustable valve is provided to selectively adjust a second pressure drop of the working fluid in the third fluid path.

In another embodiment, a dual piston adjuster for a shock absorber, wherein the shock absorber can have a housing in fluid communication with a fluid reservoir, the housing having a piston assembly and a working fluid disposed within the housing wherein a movement of the piston assembly with respect to the housing causes a flow of the working fluid between the housing and the fluid reservoir, and the dual piston adjuster includes a valve body coupled to a canister of the fluid reservoir. A first damping piston and a second damping piston can be disposed in the valve body. A first fluid path, a second fluid path, and a third fluid path are formed in the valve body. The first fluid path includes a first cross-sectional flow area and provides fluid communication of the working fluid through the valve body between the housing and the canister. The second fluid path can provide fluid communication of the working fluid from the first fluid path through the first damping piston and the second damping piston, in series, to the canister. The third fluid path includes a second cross-sectional flow area and can provide fluid communication of the working fluid from the second fluid path at a location between the first damping piston and the second damping piston to the canister, the third fluid path bypassing the second damping piston. A first adjustable valve can be disposed in the valve body and configured to selectively adjust a first pressure drop of a working fluid in the first fluid path, and a second adjustable valve can be disposed in the valve body and configured to selectively adjust a second pressure drop of the working fluid in the third fluid path.

In yet another embodiment, a method of damping a transmission of forces from a wheel to a component of a vehicle includes a step of providing a shock absorber having a housing in fluid communication with a fluid reservoir, the housing having a piston assembly and a working fluid disposed within the housing, wherein a movement of the piston assembly with respect to the housing causes a flow of the working fluid between the housing and the fluid reservoir. A dual piston adjuster is provided that includes a valve body coupled to a canister of the fluid reservoir. A first damping piston and a second damping piston can be disposed in the valve body. A first fluid path, a second fluid path, and a third fluid path are formed in the valve body. The first fluid path includes a first cross-sectional flow area and provides fluid communication of the working fluid through the valve body between the housing and the canister. The second fluid path provides fluid communication of the working fluid from the first fluid path through the first damping piston and the second damping piston, in series, to the canister. The third fluid path includes a second cross-sectional flow area and provides fluid communication of the working fluid from the second fluid path at a location between the first damping piston and the second damping piston to the canister, the third fluid path bypassing the second damping piston. A first adjustable valve can be disposed in the valve body and configured to selectively adjust a first pressure drop of a working fluid in the first fluid path, and a second adjustable valve can be disposed in the valve body and configured to selectively adjust a second pressure drop of the working fluid in the third fluid path. The method can also include the steps of disposing the shock absorber between the wheel and the component of the vehicle, and adjusting the first adjustable valve to set the first cross-sectional flow area and establish a low-speed damping through the first fluid path.

In another embodiment, a dual piston adjuster for a shock absorber includes a first damping piston and a second damping piston. The dual piston adjuster includes a first fluid path, a second fluid path, and a third fluid path. The first fluid path can have a first cross-sectional flow area and provide fluid communication bypassing the first damping piston and the second damping piston. The second fluid path can provide fluid communication from the first fluid path through the first damping piston. The third fluid path can have a second cross-sectional flow area and can provide fluid communication from the second fluid path through the second damping piston, the third fluid path bypassing the first damping piston. A first adjustable valve can be provided to selectively adjust a first pressure drop of a working fluid in the first fluid path and a second adjustable valve can be provided to selectively adjust a second pressure drop of the working fluid in the third fluid path. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
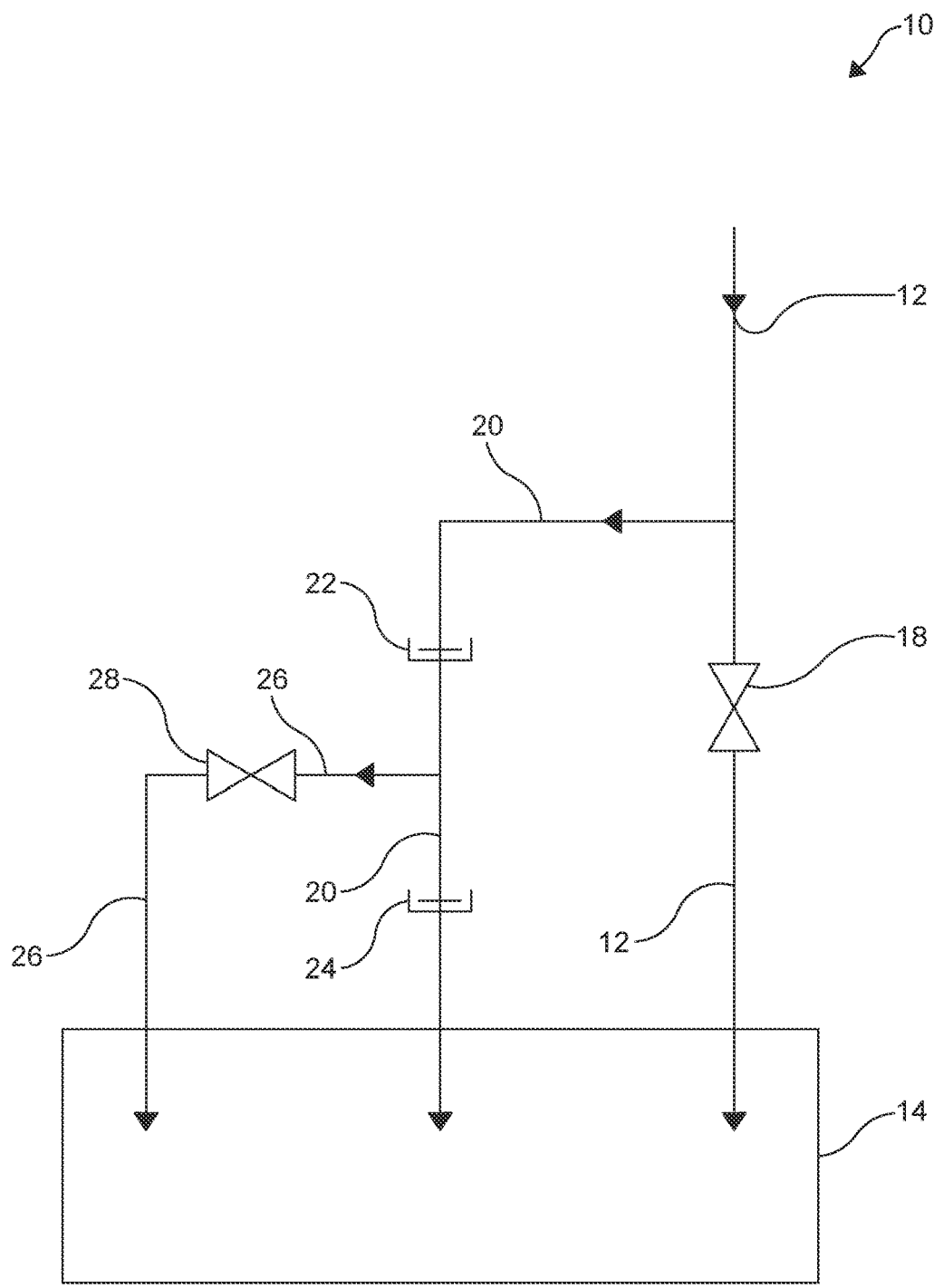
FIG. 1 is a schematic diagram of a dual piston adjuster, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combinations of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to shock absorbers and, more particularly, to a dual piston adjuster for a shock absorber providing damping capabilities across a broad range of forces that can be transmitted from a wheel to a frame or another structural component of a vehicle.

With reference to FIG. 1, a schematic diagram of a dual piston adjuster 10 for a shock absorber is shown. The dual piston adjuster 10 includes a first fluid path 12 that receives a working fluid and provides fluid communication to a canister 14 for holding the working fluid. It should be understood that the working fluid can also flow from the canister 14 through the first fluid path 12 and exit the dual piston adjuster 10. It should be understood that other fluid flow paths and valves can be provided as desired to facilitate a flow of the working fluid out of the canister 14. A first adjustable valve 18 can be provided in the first fluid path 12 configured to selectively adjust a first pressure drop of the working fluid as the working fluid exits the first adjustable valve 18. In some embodiments, the first adjustable valve 18 is configured to selectively adjust a cross-sectional flow area of the first fluid path 12 in order to reduce or increase the flow of the working fluid therethrough to adjust the first pressure drop of the working fluid to achieve a desired viscous-damping force. It should be understood that the first adjustable valve 18 can be in a fully opened position and thus not reduce the cross-sectional flow area and not create a first pressure drop of the working fluid through first fluid path 12, a fully closed position and thus essentially stopping the flow of the working fluid through first fluid path 12, or at a partially closed or partially opened position to reduce the cross-sectional flow area and create a desired first pressure drop of the working fluid through the first fluid path 12. It should be understood that in other embodiments, the first adjustable valve 18 can be one or more of a poppet valve, a pressure relief valve, or other suitable valve to achieve the desired first pressure drop of the working fluid flowing through the first fluid path 12.

The dual piston adjuster 10 includes a second fluid path 20 that provides fluid communication from the first fluid path 12 to the canister 14 for holding the working fluid. The second fluid path 20 provides for the working fluid to bypass the first adjustable valve 18 and flow to the canister 14. A first damping piston 22 and a second damping piston 24 are disposed in series in the second fluid path 20 where the working fluid can first flow through the first damping piston 22 and then flow through the second damping piston 24 before being received by the canister 14. Each of the first damping piston 22 and the second damping piston 24 is configured to create a viscous-damping force as the working fluid is forced through the first damping piston 22 and the second damping piston 24. It should be understood that a skilled practitioner can utilize any suitable damping pistons as are commonly known and used for viscous damping pistons and shock absorbers wherein the specific damping characteristics and structure of the first damping piston 22 and the second damping piston 24 can be selected as desired and/or as needed to satisfy specific design, manufacturing, and application requirements, including but not limited to preloaded valve stacks using springs and/or a cupped deflective disk. It should be understood that the damping pistons 22, 24 can be maintained in a substantially fixed or stationary position where the working fluid can flow through one or more ports or orifices formed in the damping pistons 22, 24 to provide viscous damping. Additionally, it should be understood that the damping pistons 22, 24 can be integrally formed in a component of the shock absorber, such as a housing or valve body, for example, or coupled thereto. Furthermore, it should be understood that a skilled practitioner can utilize any suitable shape for the damping pistons 22, 24 including, but not limited to, round, square, oval, and other geometric shapes as desired and/or as needed to satisfy specific design, manufacturing, and application requirements.

The dual piston adjuster 10 includes a third fluid path 26 that provides fluid communication from the second fluid path 20 to the canister 14 for holding the working fluid. The third fluid path 26 provides for the working fluid from the first damping piston 22 to bypass the second damping piston 24 and flow to the canister 14. A second adjustable valve 28 can be provided in the third fluid path 26 that is configured to selectively adjust a second pressure drop of the working fluid as the working fluid exits the second adjustable valve 28. In some embodiments, the second adjustable valve 28 is configured to selectively adjust a cross-sectional flow area of the third fluid path 26 to facilitate controlling the portion of the working fluid flowing through the third fluid path 26 and/or bypassing the second damping piston 24. Adjusting the cross-sectional flow area of the third fluid path 26 adjusts the second pressure drop of the working fluid as the working fluid exits the second adjustable valve 28 to achieve the desired viscous-damping force from the second adjustable valve 28 and the desired portion of the working fluid flowing through the second fluid path 20 and/or bypassing the second damping piston 24. It should be understood that the second adjustable valve 28 can be in a fully opened position to maximize the amount of the working fluid that can flow through the third fluid path 26 and bypass the second damping piston 24, in a partially closed or partially opened position to reduce the cross-sectional flow area of the third fluid path 26 and the amount of the working fluid that can flow through the third fluid path 26 and bypass the second damping piston 24, or in a fully closed position to minimize and/or essentially stop the working fluid from flowing through the third fluid path 26 and bypassing the second damping piston 24. It should also be understood that in other embodiments, the second adjustable valve 28 can be one or more of a poppet valve, a pressure relief valve, or other suitable valve to achieve the desired second pressure drop of the working fluid flowing through the third fluid path 26.

In operation, the working fluid flows into the first fluid path 12 of the dual piston adjuster 10. The flow of the working fluid can initially flow through the first adjustable valve 18 and to the canister 14. As the flow of the working fluid increases, a maximum flow capacity through the first adjustable valve 18 will be achieved causing a portion of the working fluid to flow into the second fluid path 20. The first fluid path 12 and the first adjustable valve 18 define a low-speed damping circuit configured to damp low speed oscillations and accommodate low speed flow of the working fluid. A user can utilize the first adjustable valve 18 to set the first pressure drop of the working fluid through the first adjustable valve 18 by modifying the effective cross-sectional flow area of the first fluid path 12 and establish the portion of the working fluid that can flow through the first fluid path 12 and the portion of the working fluid that can flow into the second fluid path 20. It should be understood that in utilizing the first adjustable valve 18 to set the first pressure drop through the first adjustable valve 18, the user can achieve a desired low-speed damping setting for the first fluid path 12.

The portion of the working fluid received by the second fluid path 20 from the first fluid path 12 can be directed through the first damping piston 22 and the second damping piston 24 in series. The second fluid path 20, the first damping piston 22, and the second damping piston 24 define a high-speed damping circuit configured to damp high speed oscillations relative to the low-speed circuit. The user can further tune the high-speed damping circuit utilizing the second adjustable valve 28. By selectively positioning the second adjustable valve 28, a desired second pressure drop of the working fluid through the second adjustable valve 28 can be achieved by modifying the effective cross-sectional flow area of the third fluid path 26 to allow a selected portion of the working fluid to enter the third fluid path 26 to bypass the second damping piston 24 and flow into the canister 14. It should be understood that in utilizing the second adjustable valve 28 to set the second pressure drop through the second adjustable valve 28, the user can achieve a desired high-speed damping setting for the second fluid path 20. It should also be understood that as used herein, the terms low-speed damping and high-speed damping are relative terms with respect to each other, for example, the low-speed damping circuit is generally configured to provide damping of oscillations that are lower speed (associated with lower velocities of the working fluid) than the oscillations being damped by the high-speed circuit (associated with higher velocities of the working fluid).

With respect to adjusting the cross-sectional flow areas of the first fluid path 12 and the third fluid path 26 to achieve the desired first and second pressure drops through the respective adjustable valves 18, 28, the first adjustable valve 18 and the second adjustable valve 28 can each operate in various ways. The adjustable valves 18, 28 can change the respective cross-sectional flow areas by selectively obstructing or opening the cross-sectional flow area of the respective fluid path 12, 26. Examples include various motion valves, such as gate valves, globe valves, fixed cone valves, needle valves, and pinch valves. The adjustable valves 18, 28 can also change the respective cross-sectional flow areas by decreasing or increasing a furcation of the respective fluid path 12, 26 relative to the adjustable valves 18, 28. The adjustable valves 18, 28 can further change the respective cross-sectional flow areas by selecting one or more branches having different branch cross-sectional flow areas for the respective fluid path 12, 26 relative to the adjustable valves 18, 28.

Figure 2:
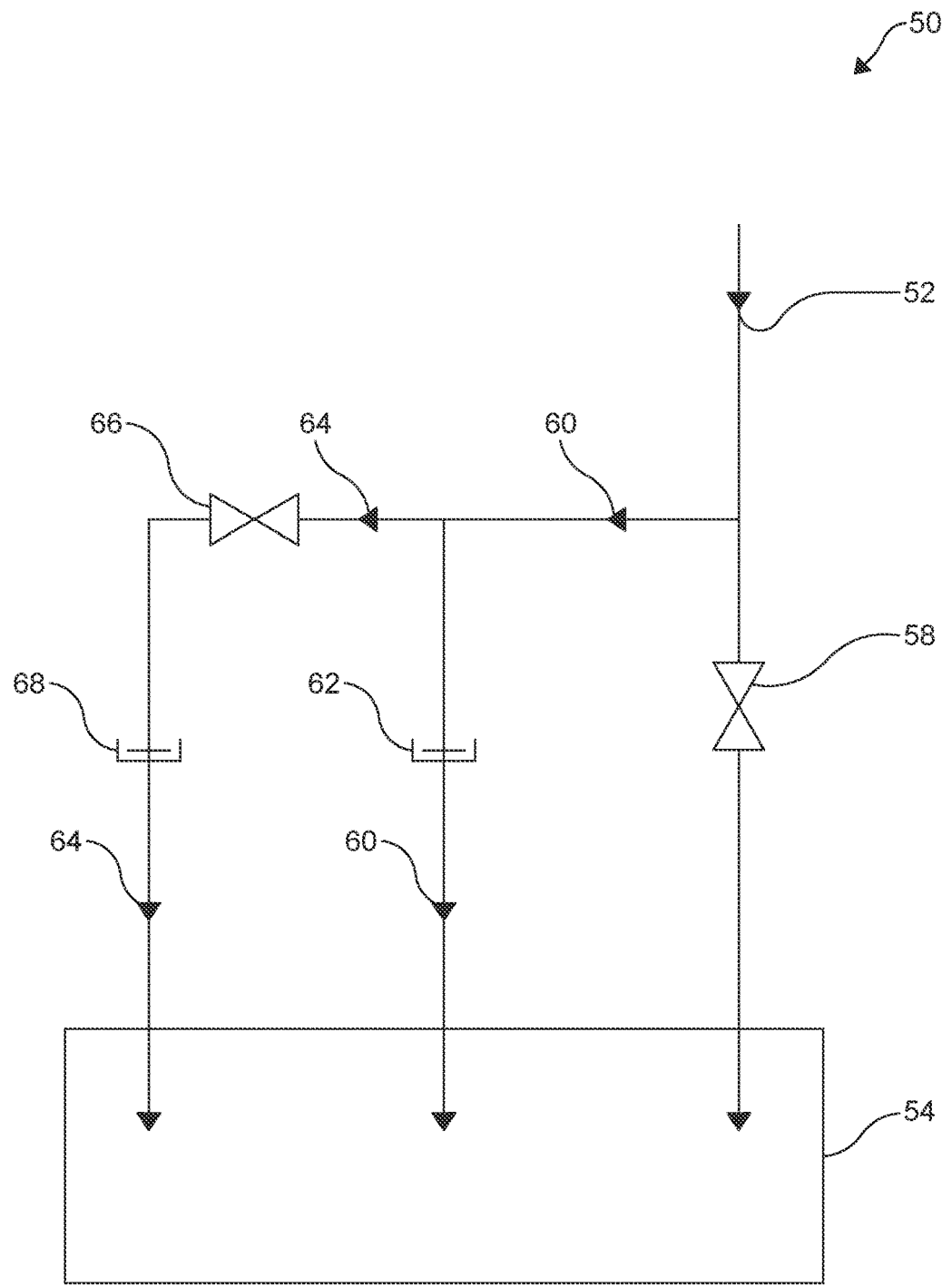
FIG. 2 is a schematic diagram of a dual piston adjuster, according to another embodiment of the present disclosure.
Figure 3:
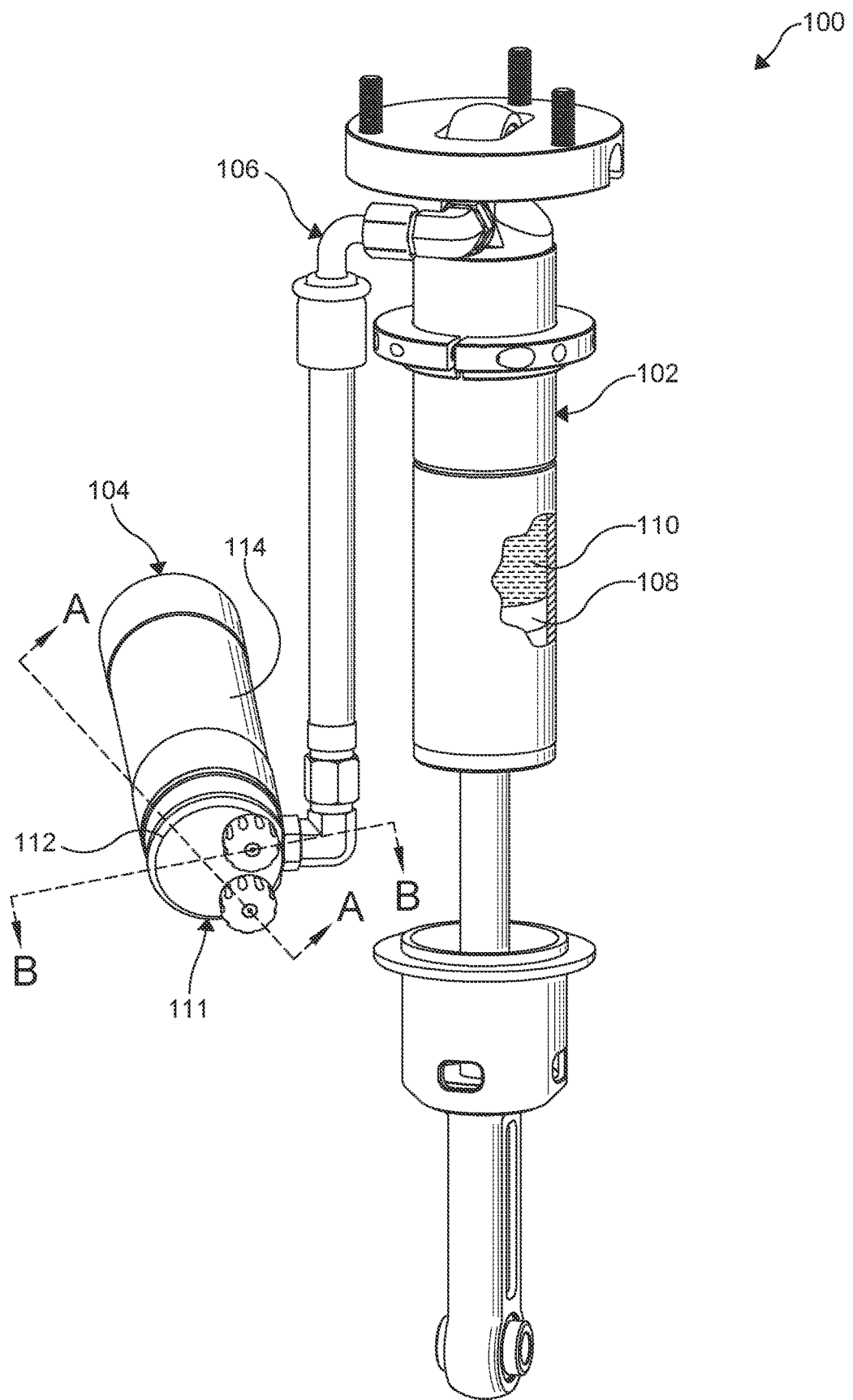
FIG. 3 is a top front fragmentary perspective view of a shock absorber including a dual piston adjuster according to an embodiment of the present disclosure.
Figure 4A:
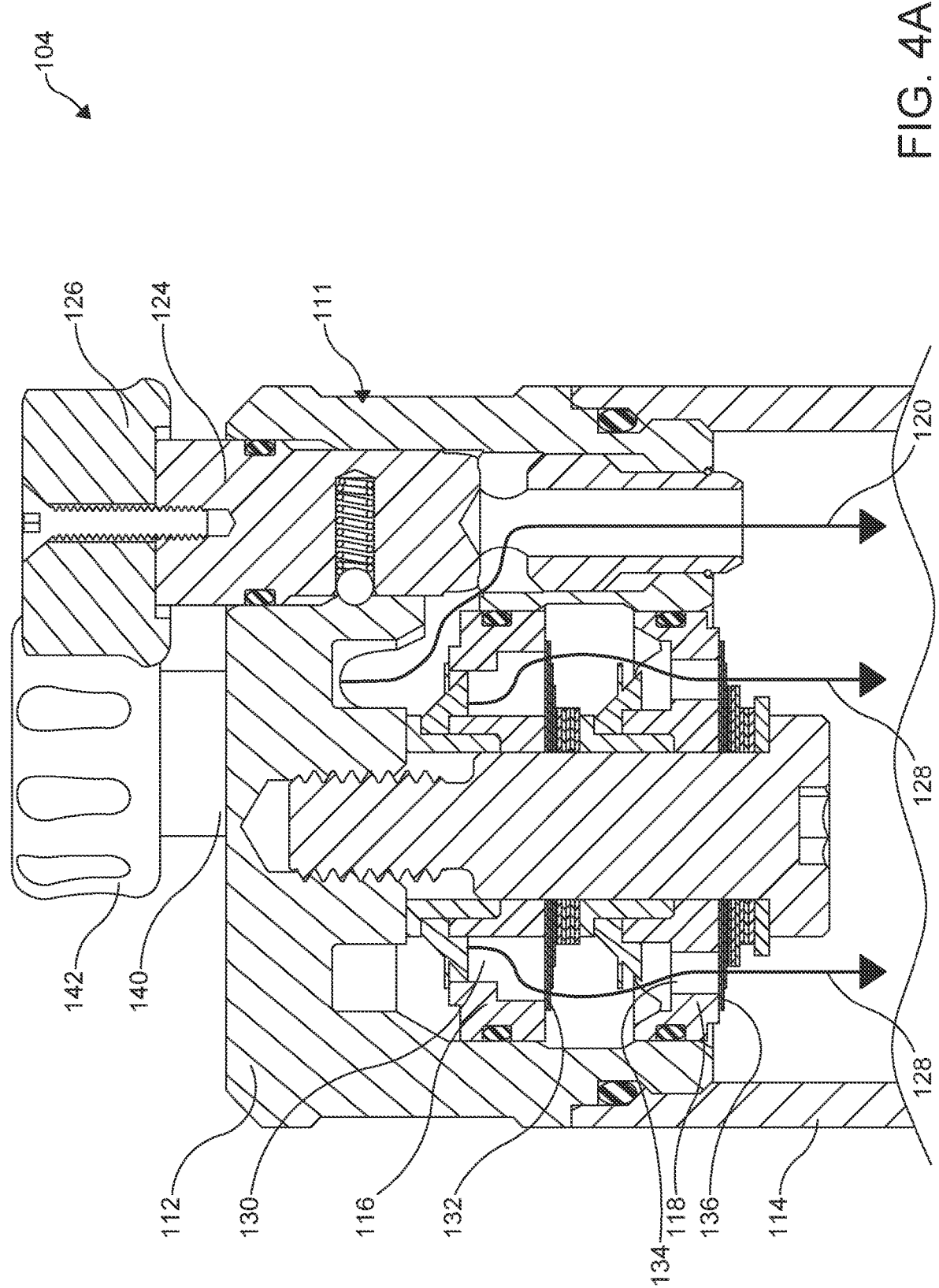
FIG. 4A is a partial cross-sectional elevational view of the dual piston adjuster taken along section line A-A of FIG. 3 showing a first adjustable valve in an open position.
Figure 4B:
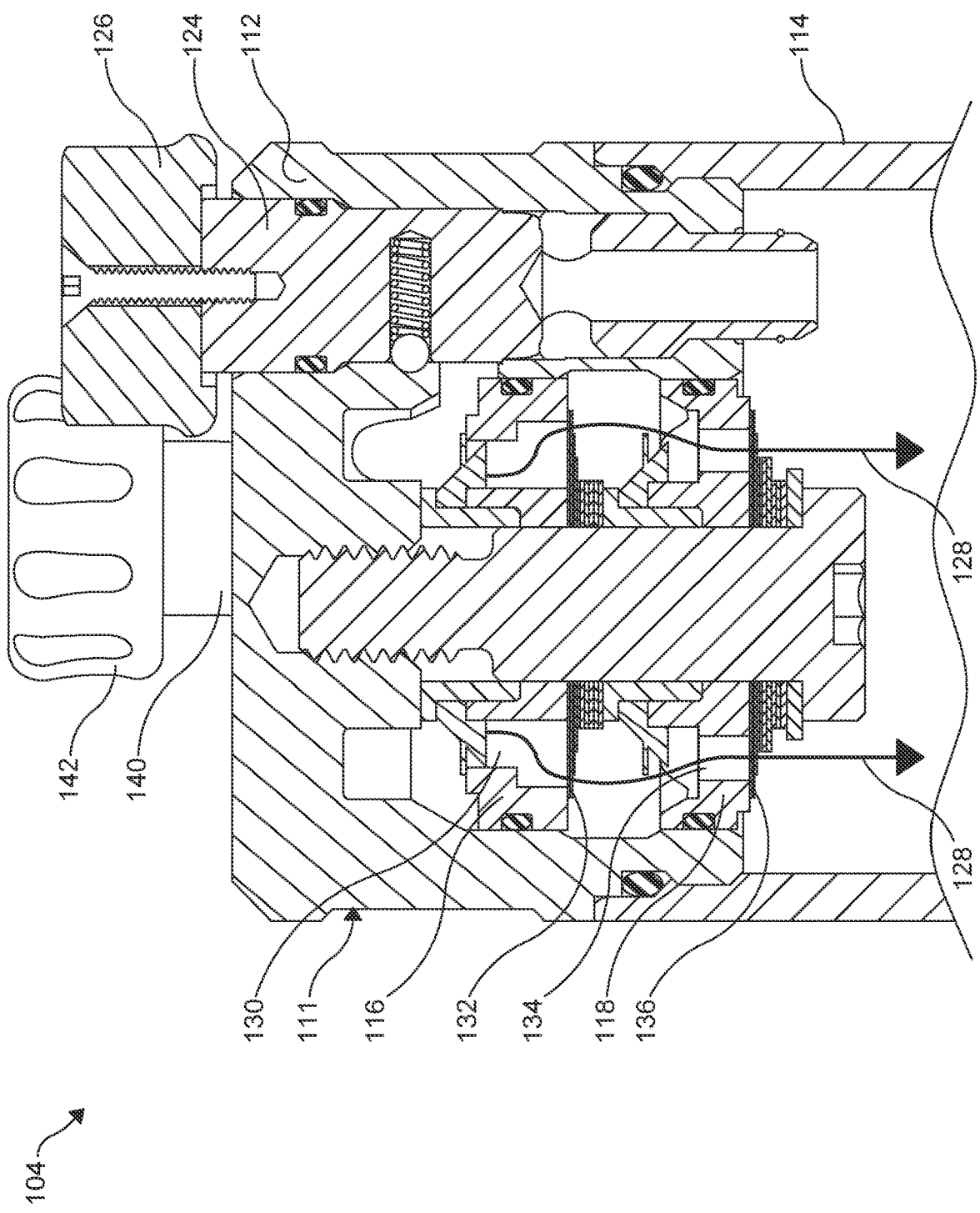
FIG. 4B is a partial cross-sectional elevational view of the dual piston adjuster taken along section line A-A of FIG. 3 showing the first adjustable valve in a closed position.

With reference to FIG. 2, a schematic diagram of a dual piston adjuster 50 for a shock absorber is shown according to another embodiment of the invention. The dual piston adjuster 50 includes a first fluid path 52 that receives a working fluid and provides fluid communication to a canister 54 for holding the working fluid. It should be understood that the working fluid can also flow from the canister 54 through the first fluid path 52 and exit the dual piston adjuster 50. It should be understood that other fluid flow paths and valves can be provided as desired to facilitate a flow of the working fluid out of the canister 54. A first adjustable valve 58 can be provided in the first fluid path 52 configured to selectively adjust a first pressure drop of the working fluid as the working fluid exits the first adjustable valve 58. In some embodiments, the first adjustable valve 58 can be a configured to selectively adjust a cross-sectional flow area of the first fluid path 52 in order to reduce or increase the flow of the working fluid therethrough to adjust the first pressure drop of the working fluid to achieve a desired viscous-damping force. It should be understood that the first adjustable valve 58 can be in a fully opened position and thus not reduce the cross-sectional flow area and not create a first pressure drop of the working fluid through first fluid path 52, a fully closed position and thus essentially stopping the flow of the working fluid through first fluid path 52, or at a partially closed or partially opened position to reduce the cross-sectional flow area and create a first pressure drop of the working fluid through the first fluid path 52. It should be understood that in other embodiments, the first adjustable valve 58 can be one or more of a poppet valve, a pressure relief valve, or other suitable valve to achieve the desired first pressure drop of the working fluid flowing through the first fluid path 52.

The dual piston adjuster 50 includes a second fluid path 60 that provides fluid communication from the first fluid path 52 to the canister 54 for holding the working fluid. The second fluid path 60 provides for the working fluid to bypass the first adjustable valve 58 and flow to the canister 54. A first damping piston 62 is disposed in the second fluid path 60 where the working fluid can first flow through the first damping piston 62 before being received by the canister 54. The first damping piston 62 is configured to create a viscous-damping force as the working fluid is forced through the first damping piston 62. It should be understood that a skilled practitioner can utilize any suitable damping piston as is commonly known and used for viscous damping pistons and shock absorbers wherein the specific damping characteristics and structure of the first damping piston 62 can be selected as desired and/or as needed to satisfy specific design, manufacturing, and application requirements, including but not limited to preloaded valve stacks using springs and/or a cupped deflective disk.

The dual piston adjuster 50 includes a third fluid path 64 that provides fluid communication from the second fluid path 60 to the canister 54 for holding the working fluid. The third fluid path 64 provides a flow path for at least a portion of the working fluid from the second fluid path 60 to bypass the first damping piston 62. A second damping piston 68 is disposed in the third fluid path 64 where the working fluid can flow from the second fluid path 64 and through the second damping piston 68 before being received by the canister 54. The second damping piston 68 is configured to create a viscous-damping force as the working fluid is forced through the second damping piston 68. It should be understood that a skilled practitioner can utilize any suitable damping piston as is commonly known and used for viscous damping pistons and shock absorbers wherein the specific damping characteristics and structure of the second damping piston 68 can be selected as desired and/or as needed to satisfy specific design, manufacturing, and application requirements, including but not limited to preloaded valve stacks using springs and/or a cupped deflective disk. A second adjustable valve 66 can be provided in the third fluid path 64 that is configured to selectively adjust a second pressure drop of the working fluid as the working fluid exits the second adjustable valve 66. In some embodiments, the second adjustable valve 66 can be configured to selectively adjust a cross-sectional flow area of the third fluid path 64 in order to reduce or increase the flow of the working fluid therethrough to adjust the second pressure drop of the working fluid. Adjusting the second pressure drop across the second adjustable valve 66, facilitates controlling the portion of the working fluid flowing through the third fluid path 64 and the second damping piston 68, and/or bypassing the first damping piston 62, thus modifying the viscous-damping forces created by the first damping piston 62 and the second damping piston 68. It should be understood that the second adjustable valve 66 can be in a fully opened position to maximize the amount of the working fluid that can flow through the third fluid path 64 and bypass the first damping piston 62, in a partially closed or partially opened position to reduce the cross-sectional flow area and create the desired second pressure drop of the working fluid through the third fluid path 64 to adjust the amount of the working fluid that can flow through the third fluid path 64 and bypass the first damping piston 62, or in a fully closed position to minimize and/or essentially stop the working fluid from flowing through the third fluid path 64 and bypassing the first damping piston 62. It should be understood that in certain embodiments, the second adjustable valve 66 can be one or more of a poppet valve, a pressure relief valve, or other suitable valve to achieve the desired second pressure drop of the working fluid flowing through the third fluid path 64.

It should be understood that the damping pistons 62, 68 can be maintained in a substantially fixed or stationary position where the working fluid can flow through one or more ports or orifices formed in the damping pistons 62, 68 to provide viscous damping. Additionally, it should be understood that the damping pistons 62, 68 can be integrally formed in a component of the shock absorber, such as a housing or valve body, for example, or coupled thereto. Furthermore, it should be understood that a skilled practitioner can utilize any suitable shape for the damping pistons 62, 68 including, but not limited to, round, square, oval, and other geometric shapes as desired and/or as needed to satisfy specific design, manufacturing, and application requirements.

In operation, the working fluid flows into the first fluid path 52 of the dual piston adjuster 50. The flow of the working fluid can initially flow through the first adjustable valve 58 and to the canister 54. As the flow of the working fluid increases, a maximum flow capacity through the first adjustable valve 58 will be achieved causing a portion of the working fluid to flow into and the second fluid path 60. The first fluid path 52 and the first adjustable valve 58 define a low-speed damping circuit configured to damp low speed oscillations and accommodate low speed flows of the working fluid. A user can utilize the first adjustable valve 58 to set the first pressure drop of the working fluid through the first adjustable valve 58 by modifying the effective cross-sectional flow area of the first fluid path 52 and establish the portion of the working fluid that can flow through the first fluid path 52 and the portion of the working fluid that can flow into the second fluid path 60. It should be understood that in utilizing the first adjustable valve 58 to set the first pressure drop of the working fluid through the first adjustable valve 58, the user can achieve a desired low-speed damping setting for the first fluid path 52.

The portion of the working fluid received by the second fluid path 60 from the first fluid path 52 can be directed through the first damping piston 62. The second fluid path 60 and the first damping piston 62 define a damping circuit configured to damp oscillations that are higher in speed of the working fluid as compared to the low-speed circuit through the first fluid path 52. The user can further tune the high-speed damping of the dual piston adjuster 50 utilizing the second adjustable valve 66. By selectively positioning the second adjustable valve 66, a desired second pressure drop of the working fluid through the second adjustable valve 66 can be achieved by modifying the effective cross-sectional flow area of the third fluid path 64 to allow a selected portion of the working fluid to enter the third fluid path 64 and flow through the second damping piston 68 into the canister 54, thus bypassing the second damping piston 62. It should be understood that in utilizing the second adjustable valve 66 to set the second pressure drop through the second adjustable valve 66, the user can achieve a desired damping setting for the second fluid path 60 and the third fluid path 64. It should also be understood that as used herein, the terms low-speed damping and high-speed damping are relative terms with respect to each other, for example, the low-speed damping circuit is generally configured to provide damping of oscillations that are lower speed (associated with lower velocities of the working fluid) than the oscillations being damped by the high-speed circuit (associated with higher velocities of the working fluid).

With respect to adjusting the cross-sectional flow areas of the first fluid path 52 and the third fluid path 64 to achieve the desired first pressure drop and the second pressure drop across the respective adjustable valves 58, 66, the first adjustable valve 58 and the second adjustable valve 66 can each operate in various ways. The adjustable valves 58, 66 can change the respective cross-sectional flow areas by selectively obstructing or opening the cross-sectional flow area of the respective fluid path 52, 64. Examples include various motion valves, such as gate valves, globe valves, fixed cone valves, needle valves, and pinch valves. The adjustable valves 58, 66 can also change the respective cross-sectional flow areas by decreasing or increasing a furcation of the respective fluid path 52, 64 relative to the adjustable valves 58, 66. The adjustable valves 58, 66 can further change the respective cross-sectional flow areas by selecting one or more branches having different branch cross-sectional flow areas for the respective fluid path 52, 64 relative to the adjustable valves 58, 66.

Now referring to FIGS. 3, 4A, 4B, 5A, and 5B, a shock absorber 100 is shown according to an embodiment of the invention. The shock absorber 100 includes a housing 102 and a fluid reservoir 104. A fluid conduit 106 can be provided for fluid communication between the housing 102 and the fluid reservoir 104. A sliding piston assembly 108 and a working fluid 110 can be disposed within the housing 102 where a movement of the sliding piston assembly 108 with respect to the housing 102 can cause a flow of the working fluid 110 through the fluid conduit 106 between the housing 102 and the fluid reservoir 104. It should be understood that the working fluid 110 can flow from the housing 102 to the fluid reservoir 104 as well as from the fluid reservoir 104 to the housing 102. In the illustrated embodiment, the fluid reservoir 104 is spaced apart from the housing 102 and in fluid communication via the fluid conduit 106. It should also be understood that other configurations for the fluid reservoir 104 can be used as desired and/or as needed to satisfy specific design, manufacturing, and application requirements, including but not limited to configurations commonly referenced as "piggyback" and "bulb" styles fluid reservoirs that can be integral with and/or directly connected to the housing 102 or other component of the shock absorber 100 or the housing 102.

The fluid reservoir 104 can include a dual piston adjuster 111 coupled to a canister 114 where the fluid conduit 106 provides fluid communication of the working fluid 110 to and from a valve body 112 of the dual piston adjuster 111. It should be understood that the housing 102, the fluid conduit 106, the sliding piston assembly 108, and the working fluid 110 can be selected from known such assemblies and components by one skilled in the art as desired and/or as needed to satisfy specific design, manufacturing, and application requirements.

As shown in FIGS. 4A, 4B, 5A, and 5B, a first damping piston 116 and a second damping piston 118 can be disposed in the valve body 112 of the dual piston adjuster 111, each of the damping pistons 116, 118 can be configured for the working fluid 110 to flow therethrough. A first fluid path 120 can be formed in the valve body 112 that provides fluid communication around, or bypassing, the first damping piston 116 and the second damping piston 118. The first fluid path 120 includes a first cross-sectional flow area and can provide fluid communication of the working fluid 110 flowing from the housing 102, through the fluid conduit 106 and the valve body 112, into the canister 114 of the fluid reservoir 104. It should be understood that the working fluid 110 can flow from the canister 114, through the first fluid path 120 and the fluid conduit 106, into the housing 102 of the shock absorber 100. It should also be understood that an additional fluid path, including any desired associated valves, can be provided to facilitate a flow of the working fluid 110 from the canister 114 into the housing 102, including a flow path from the canister 114 to the housing 102 that bypasses the dual piston adjuster 111.

It should be understood that the damping pistons 116, 118 can be maintained in a substantially fixed or stationary position with respect to the fluid reservoir 104 where the working fluid 110 can flow through one or both of the damping pistons 116, 118 to provide viscous damping. Additionally, it should be understood that the damping pistons 116, 118 can be integrally formed in a component of the shock absorber 100, such as the housing 102 (or a sub-component thereof) and the fluid reservoir 104 (or a sub-component thereof), for example, or coupled thereto. Furthermore, it should be understood that a skilled practitioner can utilize any suitable shape for the damping pistons 116, 118 including, but not limited to, round, square, oval, and other geometric shapes as desired and/or as needed to satisfy specific design, manufacturing, and application requirements.

A first adjustable valve 124 can be disposed in the valve body 112 and configured to selectively adjust a first pressure drop of the working fluid 110 as the working fluid 110 exits the first adjustable valve 124. In some embodiments, the first adjustable valve 124 can be configured to adjust the first cross-sectional flow area of the first fluid path 120 to achieve the desired first pressure drop through the first adjustable valve 124. The first adjustable valve 124 can include a first knob 126 extending outwardly from an exterior of the valve body 112. The first knob 126 can be configured to enable a user to adjust the first adjustable valve 124 by causing an axial movement of the first adjustable valve 124 through a rotation or a pushing or pulling of the first knob 126 which results in a change to the first cross-sectional flow area of the first fluid path 120. In the illustrated embodiment, the first adjustable valve 124 is a manually operated valve where a user moves the first adjustable valve 124. However, it should be understood that the first adjustable valve 124 can include an actuator capable of receiving a signal, such as a remotely provided signal including an electrical or radio signal, for example, and configured to provide a desired adjustment to the position of the first adjustable valve 124 to increase or decrease the first cross-sectional flow area of the first fluid path 120 upon a receipt of the signal. In the illustrated embodiment, the first adjustable valve 124 includes a needle valve; however, it should also be understood that other types of valves such as gate valves, ball valves, globe valves, fixed cone valves, needle valves, and pinch valves, for example, can be used for the first adjustable valve 124 as desired.

The valve body 112 includes a second fluid path 128 providing fluid communication of the working fluid 110 from the first fluid path 120 through the first damping piston 116 and the second damping piston 118, in series, to the canister 114 of the fluid reservoir 104. A first port 130 can be formed through the first damping piston 116. The first port 130 can form a portion of the second fluid path 128. A first flow restrictor 132 can be coupled to the first damping piston 116 to cover the first port 130 and/or normally close the first port 130. The flow restrictor 132 can be configured to be displaced under a first predetermined fluid pressure or at a first critical fluid pressure or a first activation pressure of the working fluid 110 in the second fluid path 128 acting on the first flow restrictor 132 to at least partially uncover and/or open the first port 130 to allow the working fluid 110 to flow through the first port 130. Upon the fluid pressure of the working fluid 110 falling below the first critical fluid pressure, the first flow restrictor 132 can return to an un-displaced or normally closed position to substantially prevent a flow of the working fluid 110 through the first port 130. It should be understood that more than one first port 130 can be formed through the first damping piston 116 and the first flow restrictor 132 can be configured to cover and/or normally close one, more than one, and/or all of the first ports 130 formed through the first damping piston 116.

In the illustrated embodiment, the first flow restrictor 132 is shown as a first deflective disk. The thickness, material, and material properties of the first deflective disk can be selected by one skilled in the art to achieve the first critical fluid pressure upon which the first deflective disk will displace/open and permit the working fluid 110 to flow through the first port 130. It should also be understood that the first deflective disk can include a plurality of disks disposed in a stacked configuration to collectively provide the desired first activation pressure. Additionally, in the illustrated embodiment the first deflective disk is a substantially flat disk that does not include preload shims or springs to maintain the normally closed position. The illustrated substantially flat first deflective disk minimizes a non-linear response of the first deflective disk and/or minimize an initial fluid pressure/force spike required to initially displace/open the first deflective disk followed by a substantially lower fluid pressure/force to maintain the displacement/open position of the first deflective disk. The linear response of the flat disk provides a more consistent damping by the first damping piston 116 as compared with damping pistons utilizing a flow restrictor having a cupped disk, preload shims, and/or springs. It should be understood that the first flow restrictor 132 can include the first flat deflective disk or another flow restrictor as desired and/or as needed to satisfy specific design, manufacturing, and application requirements, including but not limited to a cupped disk or a flow restrictor having preload shims and/or springs.

A second port 134 can be formed through the second damping piston 118. The second port 134 can form a portion of the second fluid path 128. A second flow restrictor 136 can be coupled to the second damping piston 118 to cover the second port 134 and normally close the second port 134. The second flow restrictor 136 can be configured to be displaced under a second predetermined fluid pressure or at a second critical fluid pressure or a second activation pressure of the working fluid 110 in the second fluid path 128 acting on the second flow restrictor 136 to at least partially uncover and/or open the second port 134 to allow the working fluid 110 to flow through the second port 134. Upon the fluid pressure of the working fluid 110 falling below the second critical fluid pressure, the second flow restrictor 136 can return to an un-displaced or normally closed position to substantially prevent a flow of the working fluid 110 through the second port 134. It should be appreciated that the first critical pressure associated with the first flow restrictor 132 can be greater than, equal to, or less than the second critical pressure associated with the second flow restrictor 136. It should be understood that more than one second port 134 can be formed through the second damping piston 118 and the second flow restrictor 136 can be configured to cover and/or normally close one, more than one, and/or all of the second ports 134 formed through the second damping piston 118.

In the illustrated embodiment, the second flow restrictor 136 is shown as a second deflective disk. The material, thickness, and material properties of the second deflective disk can be selected by one skilled in the art to achieve the second critical fluid pressure upon which the second deflective disk will displace/open and permit the working fluid 110 to flow through the second port 134. It should also be understood that the second deflective disk can include a plurality of disks disposed in a stacked configuration to collectively provide the desired second activation pressure. Additionally, in the illustrated embodiment the second deflective disk is a substantially flat disk that does not include preload shims or springs to maintain the normally closed position. The illustrated substantially flat second deflective disk minimizes a non-linear response of the second deflective disk and/or minimize an initial fluid pressure/force spike required to initially displace/open the second deflective disk followed by a substantially lower fluid pressure/force to maintain the displacement/open position of the second deflective disk. The linear response of the flat disk provides a more consistent damping by the second damping piston 118 as compared with damping pistons utilizing a flow restrictor having a cupped disk, preload shims, and/or springs. It should be understood that the second flow restrictor 136 can include the second flat deflective disk or another flow restrictor as desired and/or as needed to satisfy specific design, manufacturing, and application requirements, including but not limited to a cupped disk or a flow restrictor having preload shims and/or springs.

Figure 5A:
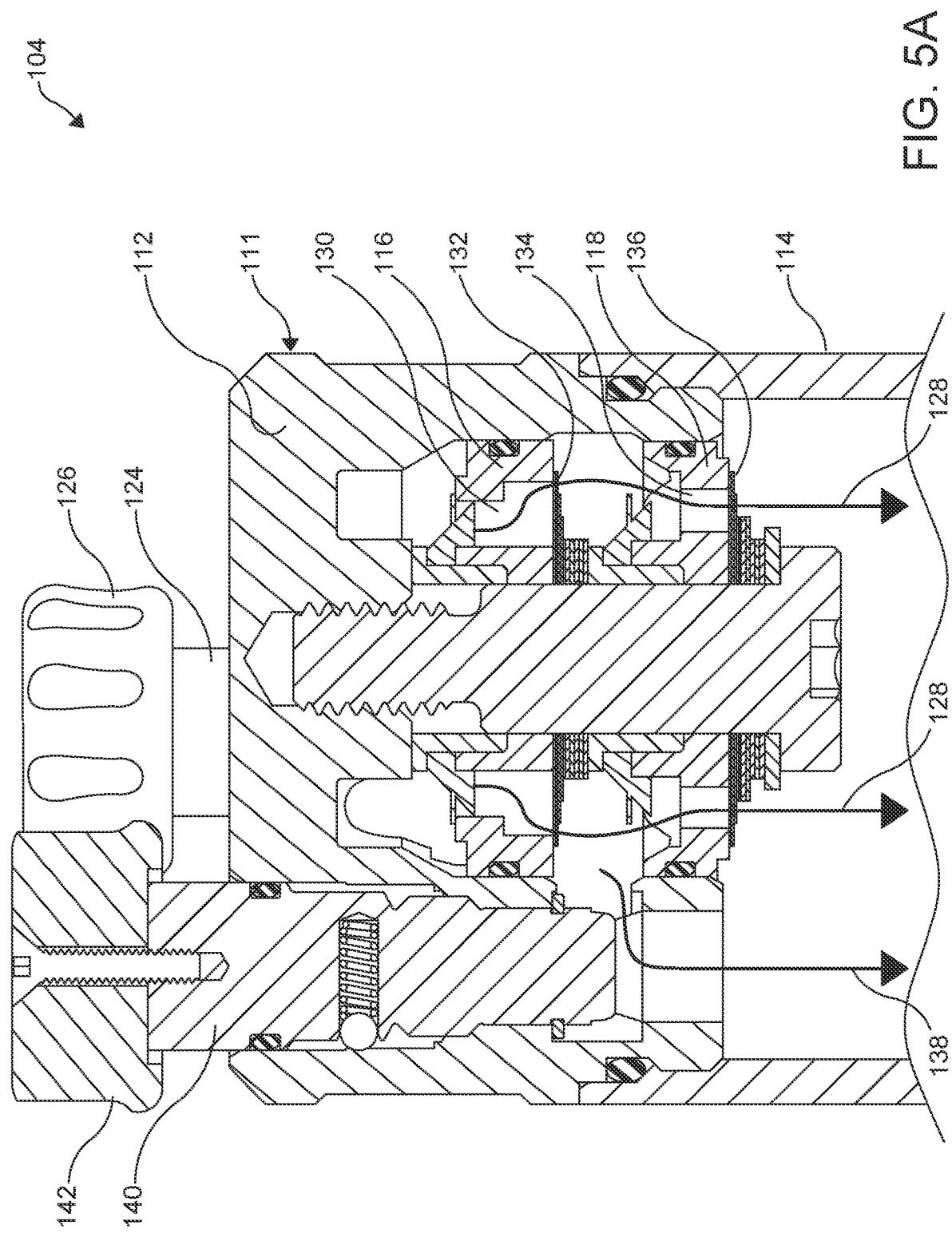
FIG. 5A is a partial cross-sectional elevational view of the dual piston adjuster taken along section line B-B of FIG. 3 showing a second adjustable valve in an open position.
Figure 5B:
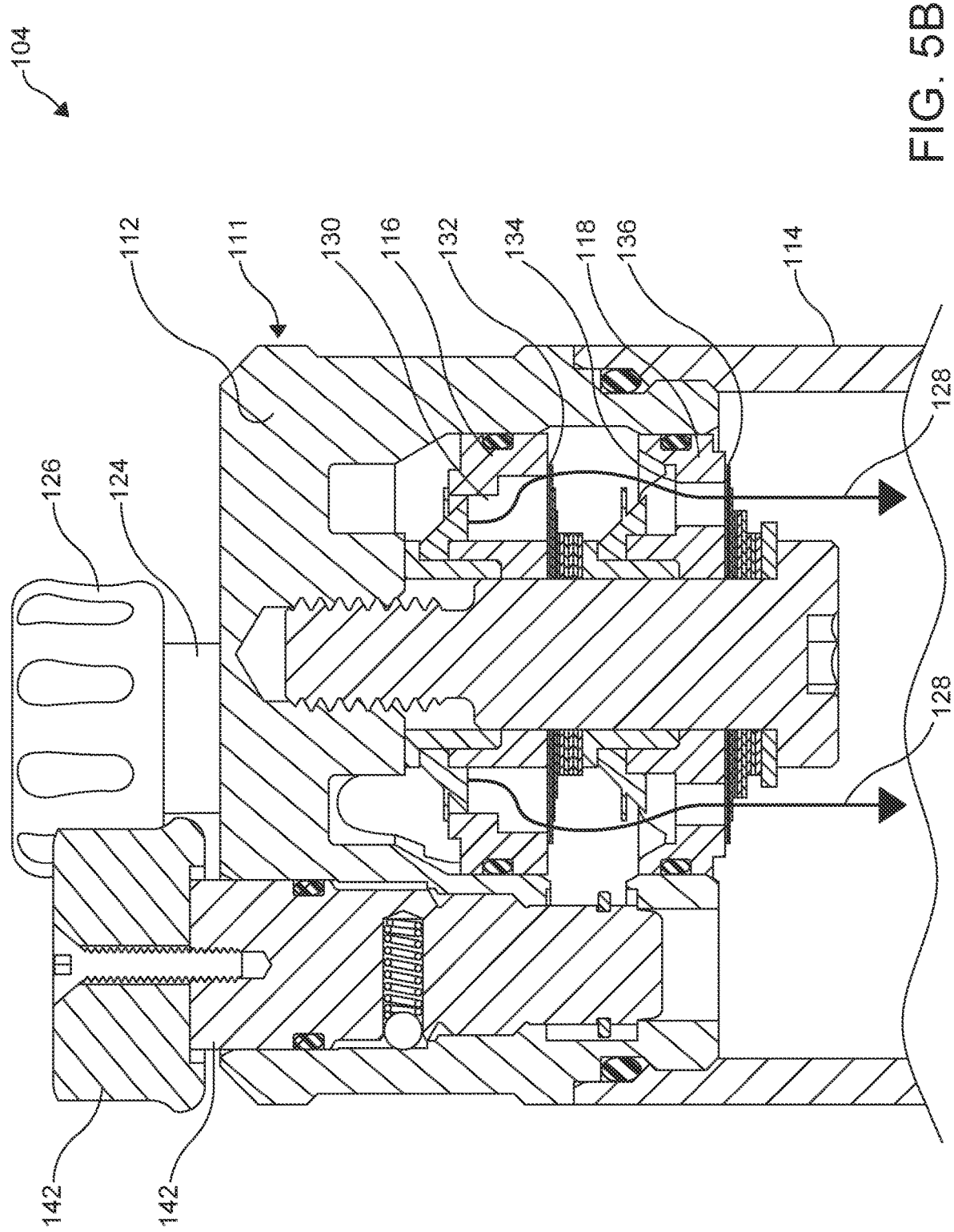
FIG. 5B is a partial cross-sectional elevational view of the dual piston adjuster taken along section line B-B of FIG. 3 showing the second adjustable valve in a closed position.

A third fluid path 138, shown in FIGS. 5A-5B, is provided in the valve body 112. The third fluid path 138 can include a second cross-sectional flow area and can provide fluid communication of the working fluid 110 from the second fluid path 128 at a location between the first damping piston 116 and the second damping piston 118 to the canister 114 of the fluid reservoir 104. The third fluid path 138 can bypass the second damping piston 118 and thus allow for a selected portion of the working fluid 110 to exit the second fluid path 128 and bypass the second damping piston 118.

A second adjustable valve 140 can be disposed in the valve body 112 and configured to selectively adjust a second pressure drop of the working fluid 110 as the working fluid 110 exits the second adjustable valve 140. In some embodiments, the second adjustable valve 140 can be configured to adjust the second cross-sectional flow area of the third fluid path 138 to achieve the desired second pressure drop through the second adjustable valve 140. The second adjustable valve 140 can include a second knob 142 extending outwardly from an exterior of the valve body 112. The second knob 142 can be configured to enable a user to adjust the second adjustable valve 140 by causing an axial movement of the second adjustable valve 140 through a rotation or a pushing or a pulling of the second knob 142 which results in a change to the second cross-sectional flow area of the third fluid path 138. In the illustrated embodiment, the second adjustable valve 140 is a manually operated valve where a user moves the second adjustable valve 140. However, it should be understood that the second adjustable valve 140 can include an actuator capable of receiving a signal, such as a remotely proved signal including an electrical or radio signal, for example, and configured to provide a desired adjustment to the position of the second adjustable valve 140 to increase or decrease the second cross-sectional flow area of the third fluid path 138 upon receipt of the signal. In the illustrated embodiment, the second adjustable valve 140 includes a needle valve; however, it should also be understood that other types of valves such as gate valves, ball valves, globe valves, fixed cone valves, needle valves, and pinch valves, for example, can be used for the second adjustable valve 140 as desired.

In use, the shock absorber 100 can be disposed between a wheel or associated suspension component of a vehicle and another component of the vehicle such as a frame member, for example. The shock absorber 100 is generally configured to damp forces being transmitted from the wheel of the vehicle to the other parts of the vehicle as the wheel encounters and traverses objects and undulations in the road and/or ground. The damping provided by the shock absorber 100 minimizes the transmission of such forces to the frame and/or other components of the vehicle. When the wheel encounters objects and undulations, the sliding piston assembly 108 moves with respect to the housing 102 and causes a flow of the working fluid 110 through fluid conduit 106. When the sliding piston assembly 108 moves away from an opening in the fluid conduit 106, the working fluid 110 is drawn from the canister 114 of the fluid reservoir, through the first fluid path 120 of the valve body 112 and the fluid conduit 106, and into the housing 102 of the shock absorber. When the sliding piston assembly 108 moves toward the opening in the fluid conduit, the working fluid 110 is forced or pushed from the housing 102, through the fluid conduit 106, and into the first fluid path 120 formed in the valve body 112 of the dual piston adjuster 111. It should be understood that other fluid flow paths and valves can be provided as desired to facilitate a flow of the working fluid out of the canister 114 and into the housing 102.

The flow of the working fluid 110 can initially flow through the first adjustable valve 124 and to the canister 114 of the fluid reservoir 104. As the flow of the working fluid 110 increases, a maximum flow capacity through the first adjustable valve 124 can be achieved causing a portion of the working fluid 110 to flow into and through the second fluid path 128. The first fluid path 120 and the first adjustable valve 124, define a low-speed damping circuit configured to damp low speed forces transmitted by the vehicle wheel. A user can utilize the first adjustable valve 124 to set the first pressure drop through the first adjustable valve by modifying the effective cross-sectional flow area of the first fluid path 120 and establish the portion of the working fluid 110 that can flow through the first fluid path 120 and the portion of the working fluid that can flow into the second fluid path 128. It should be understood that in utilizing the first adjustable valve 124 to set the first pressure drop of the working fluid 110 through the first adjustable valve 124, the user can achieve a desired low-speed damping setting for the first fluid path 120.

The portion of the working fluid received by the second fluid path 128 from the first fluid path 120 can be directed through the first damping piston 116 and the second damping piston 118 in series. The second fluid path 128, the first damping piston 116, and the second damping piston 118 define a high-speed damping circuit configured to damp high speed forces, relative to the low-speed circuit, transmitted by vehicle wheel. It should be understood that in utilizing the first adjustable valve 124 to set the first pressure drop through the first adjustable valve 124, the user can also adjust and/or can achieve a desired high-speed damping setting for the second fluid path 128. The user can further tune the high-speed damping circuit utilizing the second adjustable valve 140. By selectively positioning the second adjustable valve 140, a desired second pressure drop of the working fluid 110 through the second adjustable valve 140 by modifying the effective cross-sectional flow area of the third fluid path 138 can be set to allow a selected portion of the working fluid to enter the third fluid path 138 to bypass the second damping piston 118 and flow into the canister 114.

Figure 6:
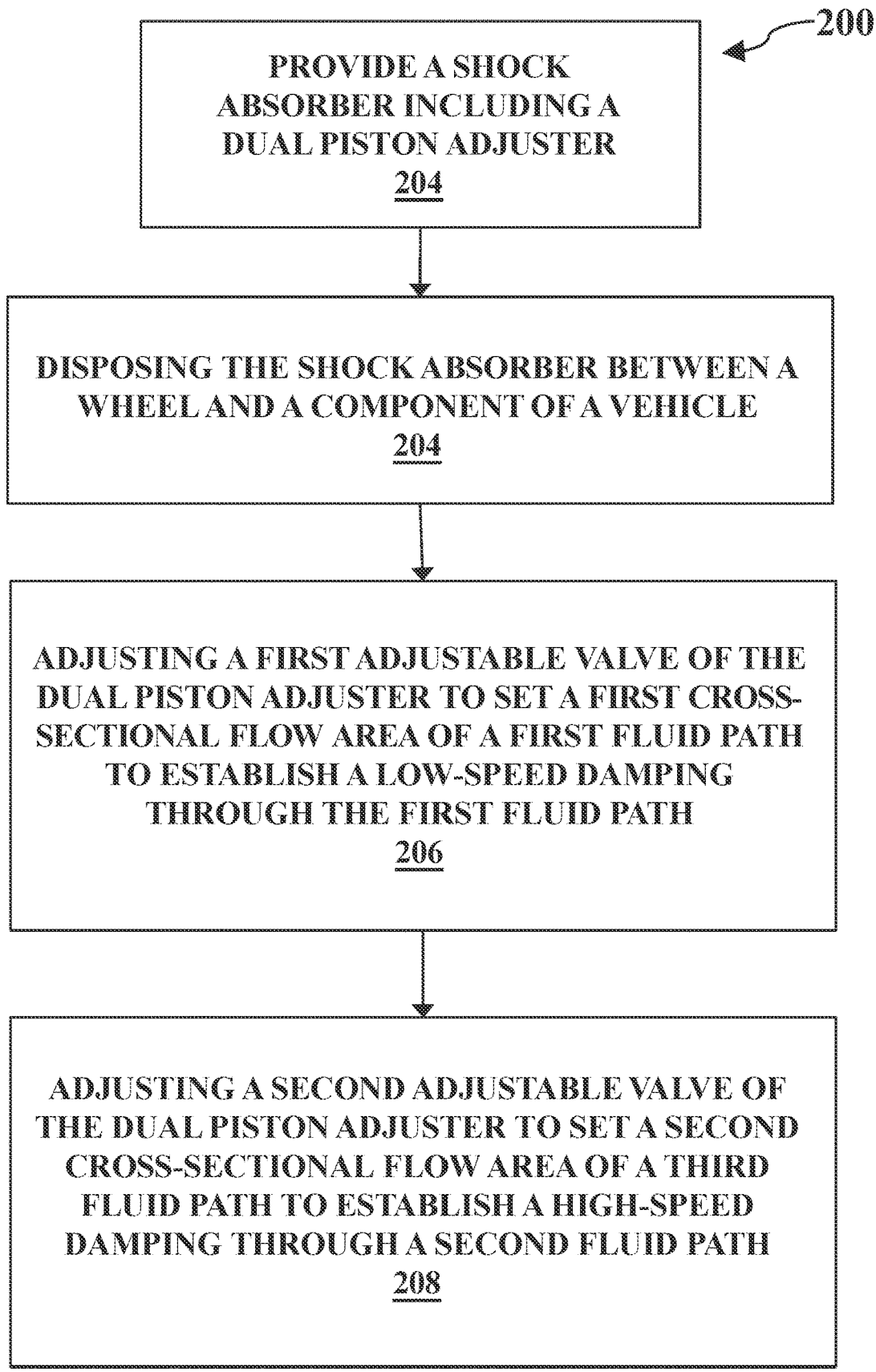
FIG. 6 is a flowchart of a method for using the shock absorber including the dual piston adjuster, according to an embodiment of the present disclosure.

In certain embodiments, as shown in FIG. 6, the present technology can be used according to a method 200 of using the dual piston adjuster 111. The method 200 can include a step 202 of providing the shock absorber 100 as described herein and having the fluid reservoir 104 including the dual piston adjuster 111. The method 200 can include a step 204 of disposing the shock absorber between a wheel and a component of a vehicle. The method 200 can also include a step 206 of adjusting the first adjustable valve 124 of the dual piston adjuster 111 to set the first cross-sectional flow area of the first fluid path 120 to establish a desired low-speed damping through the first fluid path 120, and a step 208 of adjusting the second adjustable valve 140 to set the second cross-sectional flow area of the third fluid path 138 to establish a desired high-speed damping through a second fluid path 128.

Advantageously, a dual piston adjuster 111 for a shock absorber 100 has surprisingly been developed that provides damping capabilities across a broad range of forces that can be transmitted from a wheel to a frame or other structural component of a vehicle. The dual piston adjuster 111 includes a first fluid path 120, a second fluid path 128, and a third fluid path 138 for a working fluid 110 to flow through the dual piston adjuster 111. The portion of the working fluid 110 that can flow through the respective fluid paths 120, 128, 138 can be modified by adjusting a first adjustable valve 124 disposed in the first fluid path 120 and a second adjustable valve 140 disposed in the third fluid path 138. Adjusting the portion of the working fluid 110 that can flow through the respective fluid paths 120, 128, 138 facilitates a user separately adjusting low-speed damping and high-speed damping characteristics provided by the dual piston adjuster 111 and the overall damping characteristics provided by the shock absorber 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A dual piston adjuster for a shock absorber, the dual piston adjuster comprising:
    a first damping piston;
    a second damping piston;
    a first fluid path having a first cross-sectional flow area and providing fluid communication bypassing the first damping piston and the second damping piston;
    a second fluid path providing fluid communication from the first fluid path through the first damping piston and the second damping piston in series;
    a third fluid path having a second cross-sectional flow area and providing fluid communication from the second fluid path at a location between the first damping piston and the second damping piston to bypass the second damping piston;
    a first adjustable valve configured to selectively adjust a first pressure drop of a working fluid in the first fluid path; and
    a second adjustable valve configured to selectively adjust a second pressure drop of the working fluid in the third fluid path.

2. The dual piston adjuster of claim 1, wherein the first damping piston includes:

a first port formed through the first damping piston, the first port forming a portion of the second fluid path; and a first flow restrictor coupled to the first damping piston and covering the first port, the first flow restrictor configured so that a predetermined pressure of a working fluid in the first fluid path acting on the first flow restrictor causes a displacement of the first flow restrictor to at least partially uncover the first port to allow the working fluid to flow through the first port.

3. The dual piston adjuster of claim 2, wherein the first flow restrictor includes a deflective disk.

4. The dual piston adjuster of claim 1, wherein the second damping piston includes:

a second port formed through the second damping piston, the second port forming a portion of the second fluid path; and a second flow restrictor coupled to the second damping piston and covering the second port, the second flow restrictor configured so that a predetermined pressure of a working fluid in the second fluid path acting on the second flow restrictor causes a displacement of the second flow restrictor to at least partially uncover the second port to allow the working fluid to flow through the second port.

5. The dual piston adjuster of claim 4, wherein the second flow restrictor includes a deflective disk.

6. The dual piston adjuster of claim 1, wherein the first adjustable valve includes a needle valve configured to selectively adjust the first cross-sectional flow area.

7. The dual piston adjuster of claim 1, wherein the first adjustable valve includes a first knob disposed on an exterior of the dual piston adjuster, the first adjustable valve configured to selectively adjust the first cross-sectional flow area of the first fluid path upon a movement of the first knob.

8. The dual piston adjuster of claim 1, wherein the first adjustable valve includes a first actuator configured to move the first adjustable valve to selectively adjust the first cross-sectional flow area of the first fluid path upon receipt of a signal.

9. The dual piston adjuster of claim 1, wherein the second adjustable valve includes a needle valve to selectively adjust the second cross-sectional flow area.

10. The dual piston adjuster of claim 1, wherein the second adjustable valve includes a second knob disposed on an exterior of the dual piston adjuster, the second adjustable valve configured to selectively adjust the second cross-sectional flow area of the third fluid path upon a movement of the second knob.

11. The dual piston adjuster of claim 1, wherein the second adjustable valve includes a second actuator configured to move the second adjustable valve to selectively adjust the second cross-sectional flow area of the third fluid path upon receipt of a signal.

12. A dual piston adjuster for a shock absorber, the shock absorber including a housing in fluid communication with a fluid reservoir, the housing having a piston assembly and a working fluid disposed within the housing wherein a movement of the piston assembly with respect to the housing causes a flow of the working fluid between the housing and the fluid reservoir, the dual piston adjuster comprising:

a valve body coupled to a canister of the fluid reservoir;
a first damping piston disposed in the valve body;
a second damping piston disposed in the valve body;
a first fluid path formed in the valve body having a first cross-sectional flow area and providing fluid communication of the working fluid through the valve body between the housing and the canister;

a second fluid path formed in the valve body providing fluid communication of the working fluid from the first fluid path through the first damping piston and the second damping piston, in series, to the canister;

a third fluid path formed in the valve body having a second cross-sectional flow area and providing fluid communication of the working fluid from the second fluid path at a location between the first damping piston and the second damping piston to the canister, the third fluid path bypassing the second damping piston;

a first adjustable valve disposed in the valve body configured to selectively adjust a first pressure drop of a working fluid in the first fluid path; and a second adjustable valve disposed in the valve body configured to selectively adjust a second pressure drop of the working fluid in the third fluid path.

13. The dual piston adjuster of claim 12, wherein the first damping piston includes:

a first port formed through the first damping piston, the first port forming a portion of the second fluid path; and a first flow restrictor coupled to the first damping piston and covering the first port, the first flow restrictor configured so that a predetermined pressure of the working fluid in the second fluid path acting on the first flow restrictor causes a displacement of the first flow restrictor to at least partially uncover the first port to allow the working fluid to flow through the first port; and the second damping piston includes:

a second port formed through the second damping piston, the second port forming a portion of the second fluid path; and a second flow restrictor coupled to the second damping piston and covering the second port, the second flow restrictor configured so that a predetermined pressure of the working fluid in the second fluid path acting on the second flow restrictor causes a displacement of the second flow restrictor to at least partially uncover the second port to allow the working fluid to flow through the second port.

14. The dual piston adjuster of claim 13, wherein one of the first flow restrictor and the second flow restrictor includes a deflective disk.

15. The dual piston adjuster of claim 12, wherein one of the first adjustable valve and the second adjustable valve includes a needle valve.

16. The dual piston adjuster of claim 12, wherein the first adjustable valve includes a first knob disposed on an exterior of the dual piston adjuster, the first adjustable valve configured to selectively adjust the first cross-sectional flow area of the first fluid path upon a movement of the first knob.

17. The dual piston adjuster of claim 12, wherein the second adjustable valve includes a second knob disposed on an exterior of the dual piston adjuster, the second adjustable valve configured to selectively adjust the second cross-sectional flow area of the third fluid path upon a movement of the second knob.

18. The dual piston adjuster of claim 12, wherein the first adjustable valve includes a first actuator configured to move the first adjustable valve to selectively adjust the first cross-sectional flow area of the first fluid path upon receipt of a signal; and the second adjustable valve includes a second actuator configured to move the second adjustable valve to selectively adjust the second cross-sectional flow area of the third fluid path upon receipt of a signal.

19. A method of damping a transmission of forces from a wheel to a component of a vehicle comprising:
providing a shock absorber including
a housing in fluid communication with a fluid reservoir, the housing having a piston assembly and a working fluid disposed within the housing wherein a movement of the piston assembly with respect to the housing causes a flow of the working fluid between the housing and the fluid reservoir, and
a dual piston adjuster having
a valve body coupled to a canister of the fluid reservoir;
a first damping piston disposed in the valve body;
a second damping piston disposed in the valve body;
a first fluid path formed in the valve body having a first cross-sectional flow area and providing fluid communication of the working fluid through the valve body between the housing and the canister;
a second fluid path formed in the valve body providing fluid communication of the working fluid from the first fluid path through the first damping piston and the second damping piston, in series, to the canister;
a third fluid path formed in the valve body having a second cross-sectional flow area and providing fluid communication of the working fluid from the second fluid path at a location between the first damping piston and the second damping piston to the canister, the third fluid path bypassing the second damping piston;
a first adjustable valve disposed in the valve body configured to selectively adjust a first pressure drop of a working fluid in the first fluid path; and
a second adjustable valve disposed in the valve body configured to selectively adjust a second pressure drop of the working fluid in the third fluid path;
disposing the shock absorber between the wheel and the component of the vehicle; and
adjusting the first adjustable valve to set the first cross-sectional flow area and establish a low-speed damping through the first fluid path.

20. The method of claim 19, further comprising adjusting the second adjustable valve to set the second cross-sectional flow area and establish a high-speed damping through the second fluid path.

* * * * *